E. B. Hungerford,
Glass Window Blind.
Nº 52,854. Patented Feb. 27, 1866.
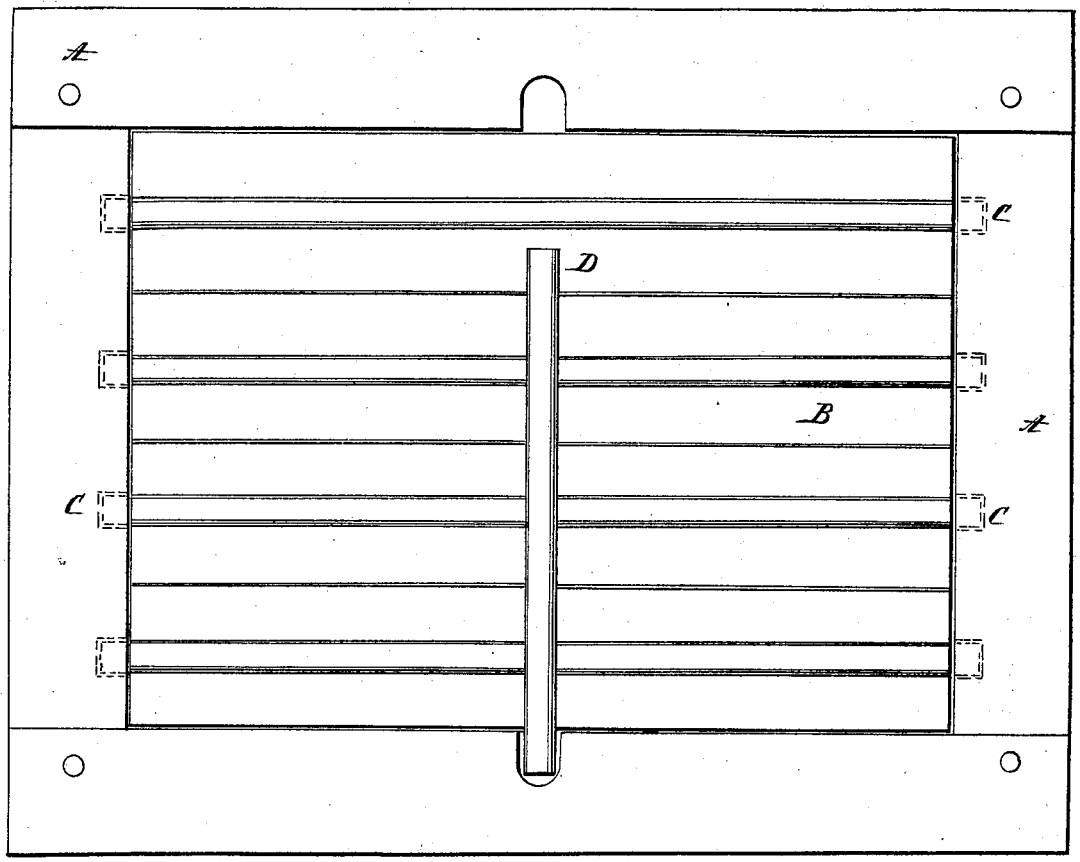
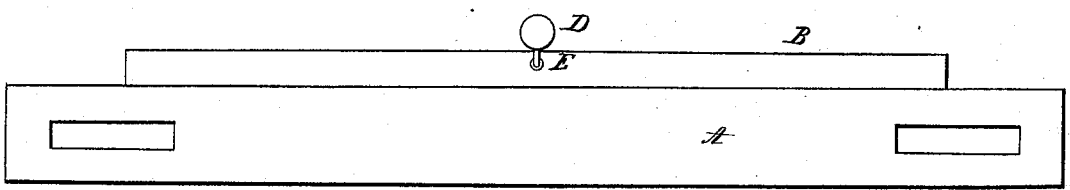
Witnesses: Inventor:
E. B. Hungerford
by his Atty.
J. Franklin Reigart

UNITED STATES PATENT OFFICE.

E. B. HUNGERFORD, OF ELMIRA, NEW YORK.

IMPROVED WINDOW-BLIND.

Specification forming part of Letters Patent No. 52,854, dated February 27, 1866.

*To all whom it may concern:*

Be it known that I, E. B. HUNGERFORD, of Elmira, Chemung county, and State of New York, have invented an Improved Blind or Shutter and Ventilator for Windows; and I do hereby declare the following to be an exact description thereof, reference being had to the accompanying drawings, and to the letters of reference marked thereon, making a part of this specification.

Figure 1 represents the blind and shutter; Fig. 2, a side view. Fig. 3 is a transverse section taken on the line $x$ $x$ of Fig. 1.

The nature of my invention consists in the construction of a slat composed entirely of glass of various colors, and of such a form as to give it great strength and having the journals formed on the ends at the same operation.

To enable others skilled in the art to construct and use my invention, I will proceed to describe it.

Attempts have heretofore been made to construct slats of glass for ventilators or blinds to be used in houses by cutting strips of glass from the ordinary flat window-glass, and then securing to the ends of such slats metallic pieces having the journals formed thereon; but such slats, for obvious reasons, failed to answer the desired purpose. In the first place, being composed of thin flat pieces of glass, they did not possess the requisite strength. Secondly, the metallic pieces cannot be secured permanently to the glass slats, and the latter, therefore, are constantly becoming displaced and broken. Again, when the slats are thus made the rod that moves them cannot be attached without drilling holes in the slats, which is expensive and also weakens the slat, rendering it more liable to break, and when the rod is thus attached it is found that in attempting to operate them by the rod the slats are broken, and hence some other means has to be provided for attaching the rod.

My invention has for its object the remedying of all these difficulties, and at the same time making an article that is far better adapted to the desired purpose.

I construct my slat B entirely of glass, with the journals C formed on each end, the same as is done in the ordinary wooden slat. This I accomplish by pressing the glass in a mold of peculiar construction, (which will form the subject of a separate application, and need not therefore be herein described,) this mold being so constructed as to give to the slat the required form and make the hole in it for attaching the rod at the same operation and while the glass is in a fluid or semi-fluid state, the entire slat, with its journals and hole, being all formed in the mold at a single operation.

In order to give to the slat the requisite strength, I construct it in the form shown in cross-section in Fig. 3, which also permits them to shut over each other more closely and neatly than when made flat.

In order to render them more ornamental, and at the same time to diffuse through the room a soft and mellow light, I give to them any desired color or tint, which is done by mixing with the materials which form the glass the requisite coloring material, at the time the glass is melted. In this way I am enabled to shade a room more or less by making the slats of glass more or less transparent, and at the same time give to the light which enters the room any desired tint to correspond with the color of the wall-paper, carpet, or furniture, thus giving to the room a most pleasing and harmonizing appearance. By this means, also, I am enabled to produce a very ornamental article, and one that never needs painting or varnishing, and that can be produced at a very cheap rate.

By constructing the glass slat of the form shown it will be apparent that the rays of light will not pass directly through it, but will be more or less broken up and diffused, whereby the slat, even when made of transparent glass, will serve as a blind, objects not being seen clearly through it. In practice, however, I propose to use glass more or less opaque, and thereby render it a more perfect blind or shade.

It is obvious that any style of ornament may be formed either by stamping it in or on the glass, the proper figure being formed in the mold. They may also be ornamented by cutting ornamental figures on the slat after it has been formed in the mold.

Having thus fully described my invention, what I claim is—

A window-blind or ventilator-slat constructed of glass, of any desired color, having the journals C formed thereon solid with the body of the slat, as and for the purposes set forth.

E. B. HUNGERFORD.

Witnesses:
J. FRANKLIN REIGART,
DANL. J. NOFFAT.